US008112335B2

(12) United States Patent
Tazartes et al.

(10) Patent No.: US 8,112,335 B2
(45) Date of Patent: Feb. 7, 2012

(54) SYSTEMS AND METHODS FOR PROCESSING PRICING DATA

(75) Inventors: David Isaac Tazartes, New York, NY (US); Yukun Gou, Wayne, PA (US); Liam Hudson, London (GB); Martin Zinkin, London (GB)

(73) Assignee: Barclays Capital Inc., New York, NY (US)

( * ) Notice: Subject to any disclaimer, the term of this patent is extended or adjusted under 35 U.S.C. 154(b) by 706 days.

(21) Appl. No.: 12/049,067

(22) Filed: Mar. 14, 2008

(65) Prior Publication Data

US 2009/0024501 A1 Jan. 22, 2009

Related U.S. Application Data

(60) Provisional application No. 60/918,186, filed on Mar. 14, 2007.

(51) Int. Cl.
*G06Q 40/00* (2006.01)
(52) U.S. Cl. ............................................................. 705/35
(58) Field of Classification Search ............... 705/35–42
See application file for complete search history.

(56) References Cited

U.S. PATENT DOCUMENTS

| 5,987,432 | A  | * | 11/1999 | Zusman et al. | 705/35 |
| 7,222,096 | B2 | * | 5/2007  | Anaya et al. | 705/37 |
| 7,424,452 | B2 | * | 9/2008  | Feilbogen et al. | 705/37 |
| 7,809,631 | B2 | * | 10/2010 | Bauerschmidt et al. | 705/37 |
| 2002/0042764 | A1 | * | 4/2002 | Gardner et al. | 705/35 |
| 2002/0099647 | A1 | * | 7/2002 | Howorka et al. | 705/37 |
| 2003/0083974 | A1 | * | 5/2003 | Bunda | 705/37 |
| 2005/0246263 | A1 | * | 11/2005 | Ogg et al. | 705/37 |
| 2005/0283422 | A1 | * | 12/2005 | Myr | 705/37 |
| 2007/0050280 | A1 | * | 3/2007 | Madle et al. | 705/37 |
| 2007/0244781 | A1 | * | 10/2007 | Ronk | 705/35 |

(Continued)

FOREIGN PATENT DOCUMENTS

WO WO2004/061618 7/2004

OTHER PUBLICATIONS

Lewis, Janet, "Devil is in Details for FX systemsNew platforms aim to revolutionize FX trading; players remain skeptical", The Investment Dealer's Digest: IDD. New York: May 15, 2006. p. 1.*

(Continued)

*Primary Examiner* — Sarah Monfeldt
*Assistant Examiner* — Mohammad Z Shaikh
(74) *Attorney, Agent, or Firm* — Morgan Lewis & Bockius LLP

(57) ABSTRACT

Processing pricing data can be provided by receiving first data associating a first price source, a first market condition, and an instrument; receiving second data from at least one of a plurality of price sources, the second data comprising a first price quote for the instrument; determining that the at least one of the plurality of price sources matches the first price source; and generating a second price quote for the instrument based on the second data. Time data may be used for synchronizing the first data and the second data. The first price source may be changed to a second price source and/or the first market condition may be changed to a second market condition; and a third price quote generated for the instrument based on the associated second price source. Cached data may be used for processing the pricing data.

18 Claims, 2 Drawing Sheets

U.S. PATENT DOCUMENTS

2008/0059353 A1* 3/2008 Ronk .............................. 705/35

OTHER PUBLICATIONS

"EBS and Bloobmberg Alliance Changes the Face of Foreign Exchange; New Choice for Professional FX Market", PR Newswire. New York: May 21, 2003. p. 1.*

"Vhayu: Vhayu Launces Velocity for Fixed Income to Capture, Store and Analyze Fixed Income Market Data; Product Currently Deployed at Major Brokerage Firms in the U.S., U.K, and Europe to Manage Market Data Streams for Multiple Asset Classes", M2 Presswire. Coventry: Feb. 5, 2007. p. 1.*

"Soliton Inc. Introduces Industry's First Feed Handler for Standard & Poor's New Global MasterFeed; Eases Integration for Clients of the Recently Enhanced Standar & Poor's Reference Data and Pricing Service", PR Newswire. New York: Mar. 27, 2006.*

International Search Report, PCT Appln. No. PCT/US08/57109.

* cited by examiner

SYSTEMS AND METHODS FOR PROCESSING PRICING DATA

PRIORITY APPLICATION

This application claims the benefit of U.S. Provisional Patent Application No. 60/918,186, filed Mar. 14, 2007, titled Systems And Methods For Processing Pricing Data. The entire contents of that application are incorporated herein by reference.

INTRODUCTION

Banks and other entities offer their customers the opportunity to trade in financial instruments, such as currencies, (also known as foreign exchange, ForEx, or FX). In general, for a typical transaction, a bank displays or otherwise provides to a customer a list of instruments for a customer to select. In such a scenario, a price is associated by the bank for each instrument.

In general, prices for an instrument are provided as a price quote. In the example of foreign exchange transactions, if a customer buys currency, an exchange rate, usually provided as a quote of a base currency/quote currency, specifies how much the customer must pay in the quote currency to obtain one unit of the base currency. If the customer is selling currency, the exchange rate specifies how much the customer would get in the quote currency when selling one unit of the base currency.

A currency exchange rate is typically given as a pair of prices: a bid price and an ask price. The ask price applies when a customer is buying a currency pair, and represents what has to be paid in the quote currency to obtain one unit of the base currency. The bid price applies when a customer is selling a currency pair, and represents what will be obtained in the quote currency when selling one unit of the base currency. The bid price is usually lower than the ask price and the difference between the ask price and the bid price is known as a spread.

When banks provide prices for instruments to customers, the banks typically obtain price information from a variety of sources. Typical sources include market sources, for example prices from Reuters or other news sources, prices from an inter-dealer broker, such as EBS, or other sources, or trading/pricing models.

Price information can be used with one or more models for pricing an instrument. For example, different criteria (for example, market liquidity, volatility, stability) may be used to decide whether to use, for example, a market price source, a model price source, a conservative price source, a historically accurate price source, or which of each market/model price to use. There is a need for a system and method that allows banking systems to change price sources used in their instrument trading systems.

Conventional systems packaged instrument price source at configuration or initialization of the application. Such systems designated instrument price sources only at initialization and could not reconfigure source changes. In order to change price sources, such systems would have to be reloaded each time a price source changes. This process can be cumbersome. Embodiments of the invention described herein overcome such shortcomings and allows trading systems to easily change designated price sources for instruments.

An embodiment of the invention is directed to a method comprising receiving first data associating a first price source, a first market condition, and an instrument; receiving second data from at least one of a plurality of price sources, said second data comprising a first price quote for said instrument; determining that said at least one of said plurality of price sources matches said first price source; and generating a second price quote for said instrument based on said second data. It is understood that embodiments of the invention may also be implemented in software.

Variations of embodiments of the invention include, for example: receiving time data for synchronizing said first data and said second data, and that said instrument comprises a currency pair. Other embodiments of the invention contemplate changing said first price source to a second price source; and generating a third price quote for said instrument based on said second price source, and generating said third quote for said instrument based on said second price source comprises using cached data received from said second price source. Another variation of the invention includes changing said first market condition to a second market condition; and generating a fourth price quote for said instrument based on a third price source associated with said second market condition, and generating said fourth price quote for said instrument based on said third price source associated with said second market condition comprises using cached data received from said third price source.

Another embodiment of the invention is directed to a system comprising: a processor communicatively coupled to a storage device and a server; wherein said storage device is configured to receive first data associating a first price source, a first market condition, and an instrument; wherein said server is configured to communicate to said processor second data received from one of a plurality of price sources, said second data comprising a first price quote for said instrument; and wherein said processor is configured to: determine that said at least one of said plurality of price sources matches said first price source, and generate a second price quote for said instrument based on said second data.

DETAILED DESCRIPTION

Methods and systems are described herein for processing pricing data in a trading system in which price information is received from a plurality of price sources for a plurality of instruments. Embodiments of the invention facilitate generating a price quote based on certain price information from price sources. Embodiments of the invention are described in connection with financial instruments, which include at least the following: Currency Pairs in Foreign Exchange transactions, U.S. Treasuries, Credit Default Swap Indices (CDX), Interest Rate Swaps, other bonds (government, agency, or corporate), any non-structured derivative (e.g., forwards, futures, swaps, options), equities, or other financial instrument. It is understood that concepts described herein are equally applicable to any instrument that has a price source.

Embodiments of the invention contemplate generating a price quote for an instrument based on price source data. In general, a price quote may be generated automatically on a periodic basis, upon change of an association of a price source and instrument, further described herein, upon change of a market condition, or other time. Embodiments of the invention improve upon conventional pricing systems by facilitating price quote generation based on dynamic changes to price sources for an instrument.

Figure 1:
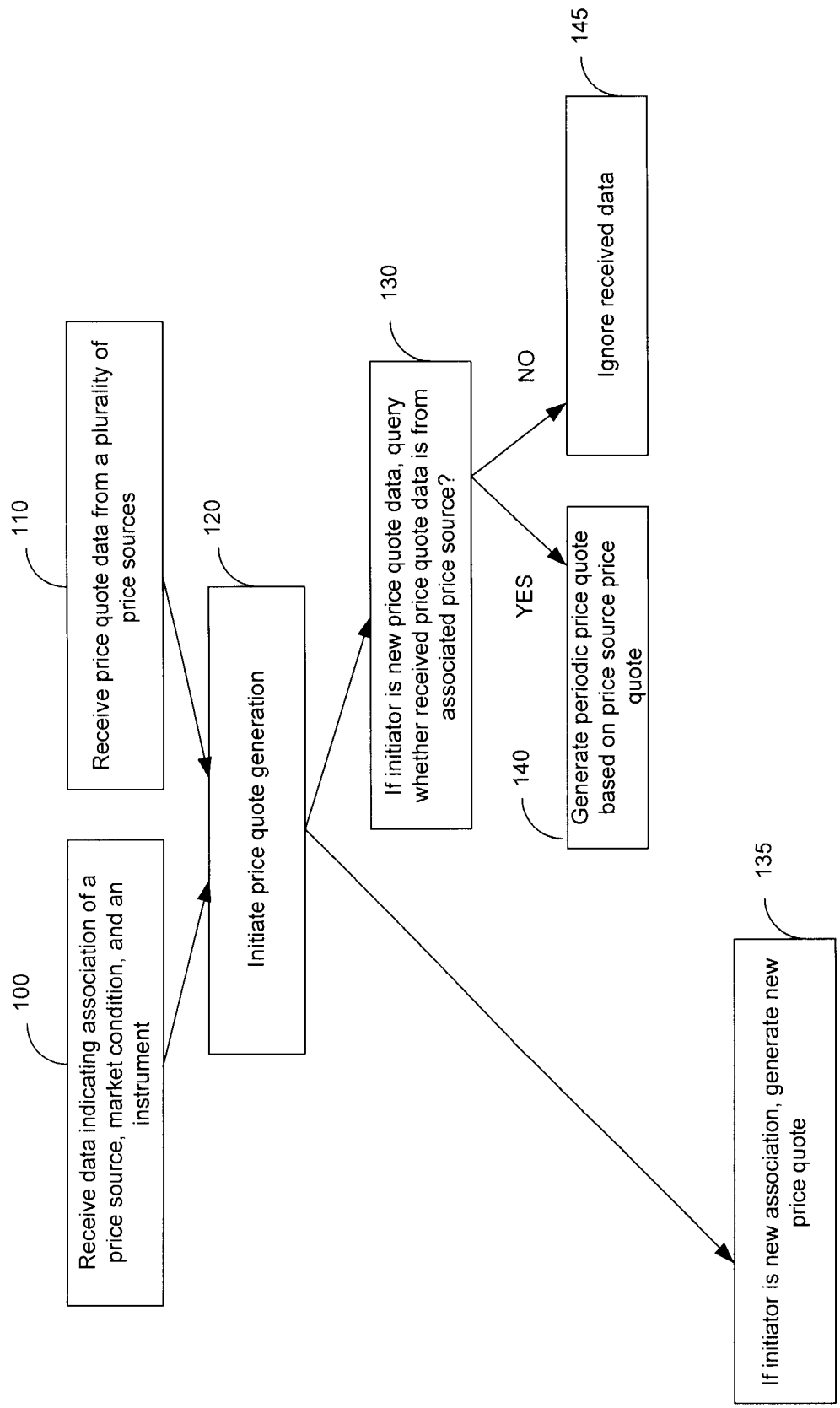
FIG. 1 depicts a flow diagram for processing pricing data according to an embodiment of the invention.

One embodiment of the invention is described with reference to FIG. 1. As shown, data is received that indicates an association of a price source and an instrument, step 100. For example, data may be received indicating an association of a first price source, such as from Reuters, other news source, an interbroker dealer, or other source for a first market condition. Market conditions can include, for example, volatile, stable, stale, or other market characteristic which may impact a price source and/or price quote. Market conditions may be determined automatically based on market data or other market indicator, or manually set based on user inputs. Market conditions may be a general condition that may affect all instruments, a condition that affects only one instrument, a condition that affects on market segment, etc.

Associations of price sources and market conditions may indicate, for example, that Reuters is a relatively stable price source, or that EBS provides price quotes that are accurate volatile markets, or that a news source provides conservative price quotes in an average market, etc. The received data may also indicate that an instrument is associated with a first price source and a first market condition. An example of an instrument may be a currency pair such as United States Dollars/European Union Euros.

In general, a first price source can be considered a preferred price source for the instrument under the first market condition. In some embodiments a priority, ranking or other rules based selection technique for price sources may be used in association for an instrument and may be based on a market condition. For example, in a stable market, price source A is used as a default price source. However, if price source A data indicates volatility, use price source B. If price source A data is outside one or more tolerance parameters (which may be based on a user input, another price source, or other parameter source), then use price source C.

Data indicating an association of an instrument, price source and market condition is typically stored in a storage device, such as a networked database or other memory component, which may be accessible by one or more servers and processors, further described herein. The processors are capable of processing data retrieved from the storage device. Data available to the processor can include that stored in the storage device and other data, such as from various price sources.

In some embodiments, data indicating a frequency period for updating a price quote for a currency period may be received. Such period can be any time period, for example, every few minutes, or other period. In other embodiments, price quotes are updated based on receipt of price source data. In general, price quotes, or 'price ticks', are generated based on price source ticks. In some embodiments, for each period a price quote is generated based on quotes from price sources, further described herein.

In other embodiments, a price quote is generated when a mapping condition changes. For example, a price quote is generated if a price source associated with an instrument is changed, a market condition indicates that a second price source should be used, etc.

Data is received relating to price quotes, from one or more price sources, step 110. In general, price quote data may be received from several price sources. Data indicating a time of such price quote data may also be received which can be used for synchronization purposes.

When data is received from a price source, step 110, and/or when data is received indicating an association of a price source, market condition, and/or instrument, step 100, a process for generating a price quote is initiated, step 120. It is understood that other quote generating initializing data (not shown) may also be received which may trigger such process. Some examples of data that may initialize a process for generating a quote may be data indicating a changing market condition, user entered data, or other data.

Upon initiation of the price quote generation, a processor, or other system component, if the initiator is new price data from a price source, the processor queries whether the received price quote is from a price source associated with the instrument, step 130. For example, the processor consults the storage device to determine whether the price quote is received from the first price source and for the instrument. In some scenarios when price source/instrument mapping changes occur, a time stamp may be used for synchronizing timing of such change.

If the received data is from the associated price source, a price quote for the instrument is generated based on the price quote, step 140. In some embodiments, steps 120-145 are repeated whenever data is received from a price source.

In some scenarios, a first price source and instrument maintain an association in the storage device. In other scenarios, during the periodic interval, a price source may change for the instrument. Such data is received in the storage device, and can replace or overwrite the original association of price source and instrument, or otherwise become a default price source and instrument association. Data indicating a time for such association may also be stored in the storage device. In some embodiments in which local storage is used for source/pair mapping, data indicating a mapping change is transmitted to a system server or processor.

If, at step 130, a query determines that a price quote for an instrument is received from a price source that does not match a price source associated with the instrument, e.g., by consulting storage device instrument/price source mapping, the received data is ignored, step 145. Following step 145, step 120 may be repeated upon receipt of triggering data.

Although the received data is ignored in step 145, it may be cached together with a time stamp, or otherwise maintained for future use. In some embodiments, if a price source associated with an instrument is changed, the processor may generate a new price quote based on the new price source, which may require using a cached received quote.

When a price quote is generated when the initiator is a new association, such as a new mapping of a price source, market condition, and/or instrument, a new price quote is generated, step 135. In such a case, the processor may generate the price quote based on cached data received from the newly associated price source.

In some embodiments of the invention, a plurality of instruments are each assigned a respective price source for a specific market condition. Rankings or priorities for each price source, instrument, and associated market condition may also be assigned. The instrument/source mapping is stored in the storage device. Upon start up of a system, a computer, processor or other device uploads mapping data from the storage device and stores it in local or other networked memory. Such computer is also registered or otherwise subscribed to receive price quote data from a plurality of price sources.

Instrument/source/market condition mapping may be changed dynamically in accordance with an algorithm, user input, or otherwise changed. As mentioned above, such changes can initiate a price quote to be generated based on price quote data received from the newly associated price source.

When new price quote data for an instrument is received from a registered price source, the processor compares the price source of the price quote with the mapped or associated price source/instrument. If the source of the new price quote differs with the source associated with the instrument, the new price quote is ignored. If the source of the new price quote is the same as from the source associated with the instrument, the new price quote is processed for generating a price quote.

If an associated price source and instrument mapping change, such change is reflected in the storage device by overwriting or otherwise replacing data indicating the change in instrument/price source mapping. Data indicating such a change may be transmitted to the processor to be uploaded to its local storage. In some embodiments, each time new price data is received, the processor queries the storage device to determine the current instrument/price source mapping.

In some embodiments, only one price source is associated with each instrument. The system receives quote prices from a plurality of sources, but ignores all price quotes except for those from an associated price source. Thus, changing the associated price source while maintaining receipt of quotes from a plurality of price sources allows for quick changes of price source which can be used to, for example, provide accurate and better price quotes for quickly changing market conditions. Such configuration also allows system performance to be maintained at a relatively high level. Price source/market condition/instrument mapping may be reassigned or mapped dynamically based on one or more inputs from a user or automatically based on an algorithm for selecting a price source.

Figure 2:
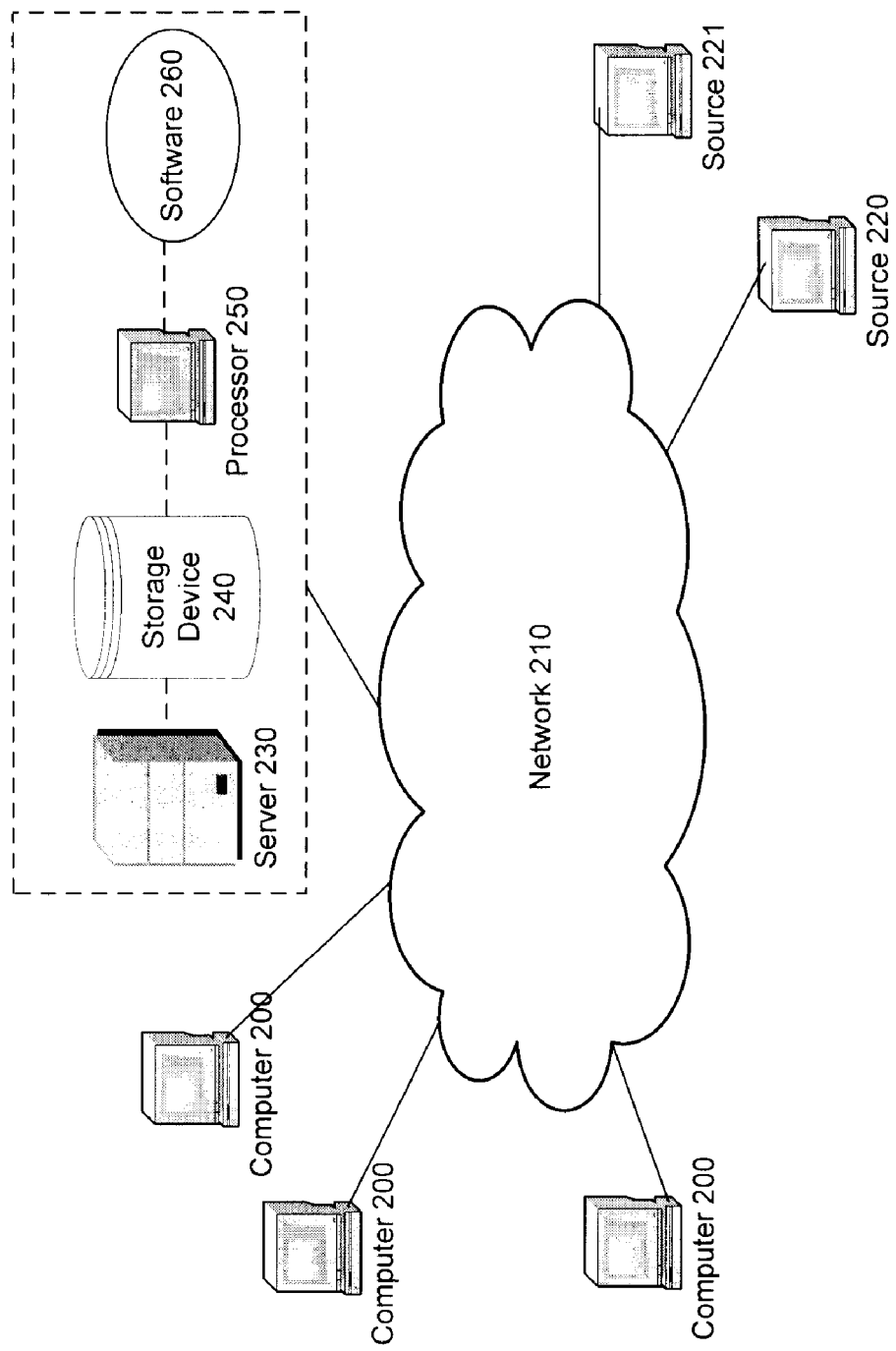
FIG. 2 depicts a system for processing pricing data according to an embodiment of the invention.

Inventions described herein may be provided using the exemplary system of FIG. 2. As shown, computers 200 communicate via network 210 with a central server 230. A plurality of price sources 220-221 also communicate via network 210 with a central server 230, processor 250, or other component to transmit, for example, price quote data. The server 230 is coupled to one or more storage devices 240, one or more processors 250, and software 260. Other components and combinations of components may also be used to support processing pricing data or other calculations described herein as will be evident to one of skill in the art. Server 230 may facilitate communication of mapping or association data from a storage device 240 to and from processor 250, and communications of generated price quotes to computers 200. Processor 250 facilitates, for example, determining whether mapping of price source/instruments match that of received price quotes from price sources 220-221. Processor 250 may optionally include local or networked storage (not shown) which may be used to store temporary mapping information. Processor 250 may also be used to process price quotes based on the received price quote and mapped data.

Software 260 can be installed locally at a computer 200, processor 250 and/or centrally supported for facilitating price processing calculations and applications. For example, software 260 may be used in embodiments where associations of price source, market conditions and instruments are interrelated.

It will be appreciated that the present invention has been described by way of example only, and that the invention is not to be limited by the specific embodiments described herein. Improvements and modifications may be made to the invention without departing from the scope or spirit thereof.

Embodiments of the present invention comprise computer components and computer-implemented steps that will be apparent to those skilled in the art. For example, calculations and communications can be performed electronically, and agreements can be composed, transmitted and executed electronically.

For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

What is claimed is:

1. A computer-implement method comprising: receiving, via a computer, first data comprising a first price source, a first market condition, and a currency pair; receiving, via computer, second data comprising a second price source; determining, via a computer, a price source by selecting between the first price source and second price source based on said first market condition; and generate a price quote based on said first or second data.

2. The computer-implemented method of claim 1 further comprising receiving, via a computer, time data for synchronizing said first data and said second data.

3. The computer-implemented method of claim 1 further comprising, upon change of an association between said first price source and said instrument, generating, via a computer, a second price quote for said instrument based on a third price source.

4. The computer-implemented method of claim 3, wherein said generating, via a computer, said second price quote for said instrument based on said third price source comprises using cached data received, via a computer, from said third price source.

5. The computer-implemented method of claim 1 further comprising, upon said first market condition changing to a second market condition, generating, via a computer, a third price quote for said instrument based on a fourth price source associated with said second market condition.

6. The computer-implemented method of claim 5, wherein said generating, via a computer, said third price quote for said instrument based on said fourth price source associated with said second market condition comprises using cached data received, via a computer, from said fourth price source.

7. A system comprising: a processor communicatively coupled to a storage device and a server; wherein said storage device is configured to receive first data comprising a first price source, a first market condition, and a currency pair; wherein said server is configured to communicate to said processor second data received from a second price source; and wherein said processor is configured to: determine a price source by selecting between the first price source and second price source based on said first market condition, and generate a price quote based on said first or second data.

8. The system of claim 7, wherein said server is further configured to communicate time data for synchronizing said first data and said second data, and wherein said processor is further configured to receive time data for synchronizing said first data and said second data.

9. The system of claim 7, wherein upon change of an association between said first price source and said instrument, said processor is further configured to generate a second price quote for said instrument based on a third price source.

10. The system of claim 9, wherein cached data received from said third price source is used to generate said second price quote.

11. The system of claim 7, wherein upon said first market condition changes to a second market condition, said processor is further configured to generate a third price quote for said instrument based on a fourth price source associated with said second market condition.

12. The system of claim 11, wherein cached data received from said fourth price source is used to generate said third price quote.

13. A non-transitory computer readable medium having stored thereon computer executable instructions that, when executed on a computer, configure the computer to perform a method comprising: receiving, via a computer, first data comprising a first price source, a first market condition, and a currency pair; receiving, via a computer, second data comprising a second price source; determining, via a computer, a price source by selecting between the first price source and second price source based on said first market condition; and generating, via a computer, a price quote based on said first or second data.

14. The non-transitory computer readable medium of claim 13, said method further comprising receiving, via a computer, time data for synchronizing said first data and said second data.

15. The non-transitory computer readable medium of claim 13, said method further comprising upon change of an association between said first price source and said instrument, generating, via a computer, a third price quote for said instrument based on a second price source.

16. The non-transitory computer readable medium of claim 15, said method further comprising using cached data received, via a computer, from said third price source to generate, via a computer, said second price quote.

17. The non-transitory computer readable medium of claim 13, said method further comprising upon said first market condition changing to a second market condition, generating, via a computer, a fourth price quote for said instrument based on a third price source associated with said second market condition.

18. The non-transitory computer readable medium of claim 17, said method further comprising using cached data received, via a computer, from said fourth price source to generate, via a computer, said third price quote.

* * * * *